(12) United States Patent
Miller

(10) Patent No.: US 6,682,044 B2
(45) Date of Patent: Jan. 27, 2004

(54) PINCH VALVE

(76) Inventor: Wayne L. Miller, 4 Lenape Dr., Stanhope, NJ (US) 07874

( * ) Notice: Subject to any disclaimer, the term of this patent is extended or adjusted under 35 U.S.C. 154(b) by 15 days.

(21) Appl. No.: 10/007,499

(22) Filed: Nov. 4, 2001

(65) Prior Publication Data

US 2002/0088954 A1 Jul. 11, 2002

Related U.S. Application Data

(60) Provisional application No. 60/245,845, filed on Nov. 4, 2000.

(51) Int. Cl.$^7$ .................................... F16K 7/02
(52) U.S. Cl. ............................ 251/4; 604/250
(58) Field of Search ...................... 251/4, 7, 8, 9, 251/10; 604/250

(56) References Cited

U.S. PATENT DOCUMENTS

| | | | | |
|---|---|---|---|---|
| 2,842,331 A | * | 7/1958 | Anderson | 251/9 |
| 2,998,956 A | * | 9/1961 | Etten | 251/10 |
| 3,759,483 A | * | 9/1973 | Baxter | 251/7 |
| 4,128,326 A | * | 12/1978 | Selak | 251/9 |
| 4,262,876 A | * | 4/1981 | Willatt | 251/9 |
| 4,372,345 A | | 2/1983 | Mehus | |
| 4,569,502 A | * | 2/1986 | Elliott | 251/8 |
| 4,928,719 A | * | 5/1990 | Inukai et al. | 251/7 |
| 5,197,708 A | * | 3/1993 | Campau | 251/8 |
| 5,515,930 A | | 5/1996 | Glaser | |
| 5,630,798 A | | 5/1997 | Beiser et al. | |
| 5,630,799 A | | 5/1997 | Beiser et al. | |
| 5,643,203 A | | 7/1997 | Beiser et al. | |
| 5,643,302 A | | 7/1997 | Beiser et al. | |
| 5,662,611 A | | 9/1997 | Beiser et al. | |
| 5,800,383 A | | 9/1998 | Chandler et al. | |
| 5,830,180 A | | 11/1998 | Chandler et al. | |
| 5,840,060 A | | 11/1998 | Beiser et al. | |
| 5,882,339 A | | 3/1999 | Beiser et al. | |
| 5,947,348 A | * | 9/1999 | Briski | 251/7 |
| 6,024,720 A | | 2/2000 | Chandler et al. | |
| 6,280,408 B1 | | 8/2001 | Sipin | |

FOREIGN PATENT DOCUMENTS

DE            2341309          2/1975

OTHER PUBLICATIONS

European Patent Office International Search Report dated Jul. 18, 2002 related to PCT Application No. PCT/US01/46621.

* cited by examiner

Primary Examiner—John Bastianelli
(74) Attorney, Agent, or Firm—Tucker Ellis & West LLP

(57) ABSTRACT

A pinch valve for pinching closed a tube which has a linear actuator connected pivotally a pointer. The linear actuator is parallel to the tube and the end of the pointer that engages the tube is made to follow a path that is perpendicular to the tube when the valve is closed. When the pinch valve is closed, the pointer is perpendicular to, and supported by, both the linear actuator and the tube.

8 Claims, 5 Drawing Sheets

PINCH VALVE

CROSS-REFERENCE TO RELATED APPLICATIONS

This application claims the benefit of U.S. Provisional Application No. 60/245,845, filed Nov. 4, 2000.

BACKGROUND OF THE INVENTION

The present invention relates to the field of valves and valve controllers. Pinch valves are well known to those of ordinary skill in the art. Typically, pinch valves employ a spring-loaded system. Prior art pinch valves have certain disadvantages. Over time, these pinch valves often cut into the tubing that they cooperate with. These pinch valves require power to maintain a valve held open or pinched off. The earlier designs required significant actuation power and high profiles.

Accordingly, there is a need for an improved pinch valve that addresses and overcomes the disadvantages of the earlier pinch valves. In addition, it is desirable that the pinch valve provides a positive pinch-off without cutting into the tubing it cooperates with. It is also desirable the pinch valve provides an adjustable pinch-off aperture. It is further desirable that the pinch valve provides a high force pinch-off while requiring low activation power, preferably about 5 watts maximum at about 5 volts, while requiring no power to hold in the valve. Furthermore, the need exists for a pinch valve that has a profile of less than about 0.700" high, is magnetically and thermally isolated from the tubing, and allowing for non-threaded tubing to be installed and removed.

SUMMARY OF THE INVENTION

The present invention is for a pinch valve for pinching off a tube, the valve comprising a linear actuator, a moveable back piece against which pressure can be applied, and a pointer rotatably connected to the linear actuator wherein the pointer is not in contact with the tube when the pinch valve is in the open position, but is essentially perpendicular with the tube in the pinched-off position.

It is also contemplated that the linear actuator may further comprise a follower. Furthermore, the linear actuator may also comprise a motor. In addition, a guide may be included for guiding the pointer. Preferably the linear actuator is essentially parallel to the tube and the pointer is perpendicular to the tube when the valve is in the closed or pinched-off position.

In the preferred embodiment it is contemplated that the moveable back piece is an eccentric. Preferably, the eccentric is adjustable and is selectively moved between a minimum and maximum position which controls the amount of pinch off.

A biasing spring may be provided for holding the tubing in place. It is also contemplated that more than one biasing spring may be utilized for improved stability.

The aspects, features and advantages of the present invention are readily apparent from the following description of the preferred embodiments when taken in connection with the accompanying drawings.

BRIEF DESCRIPTION OF THE DRAWINGS

Comprehension of the invention is facilitated by reading the following detailed description, in conjunction with the associated drawings, in which.

DETAILED DESCRIPTION OF INVENTION

Figure 1A:
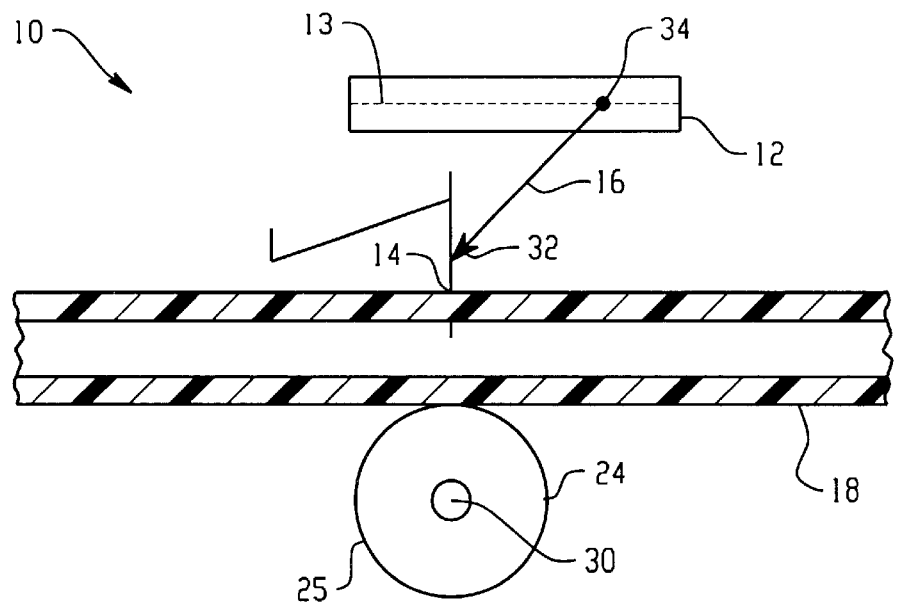
FIG. 1a is the top view of the pinch valve of the present invention in the open position.
Figure 1B:
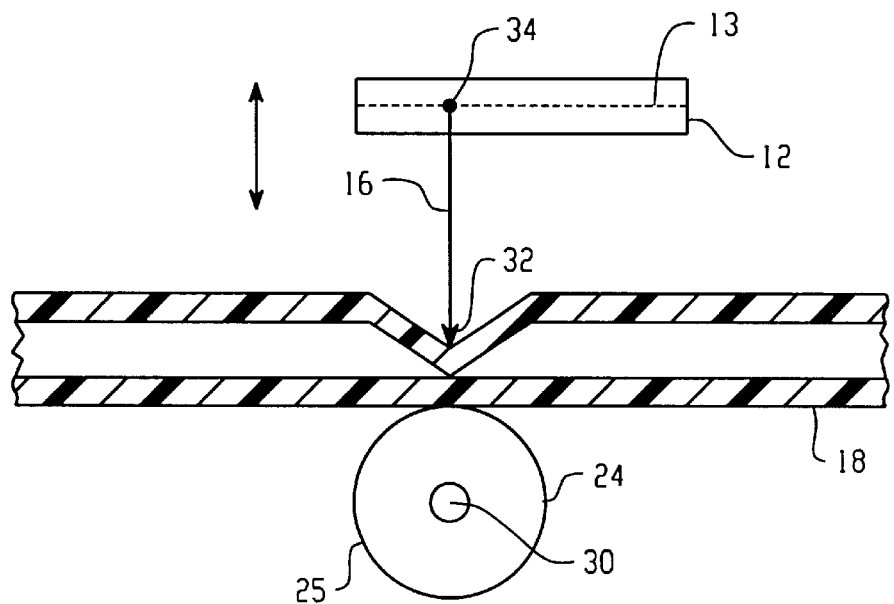
FIG. 1b is the top view of the pinch valve of the present invention in the closed position.
Figure 3:
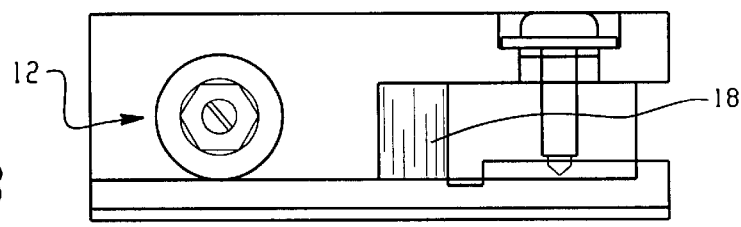
FIG 3 is the right side view of the pinch valve of the present invention.
Figure 2:
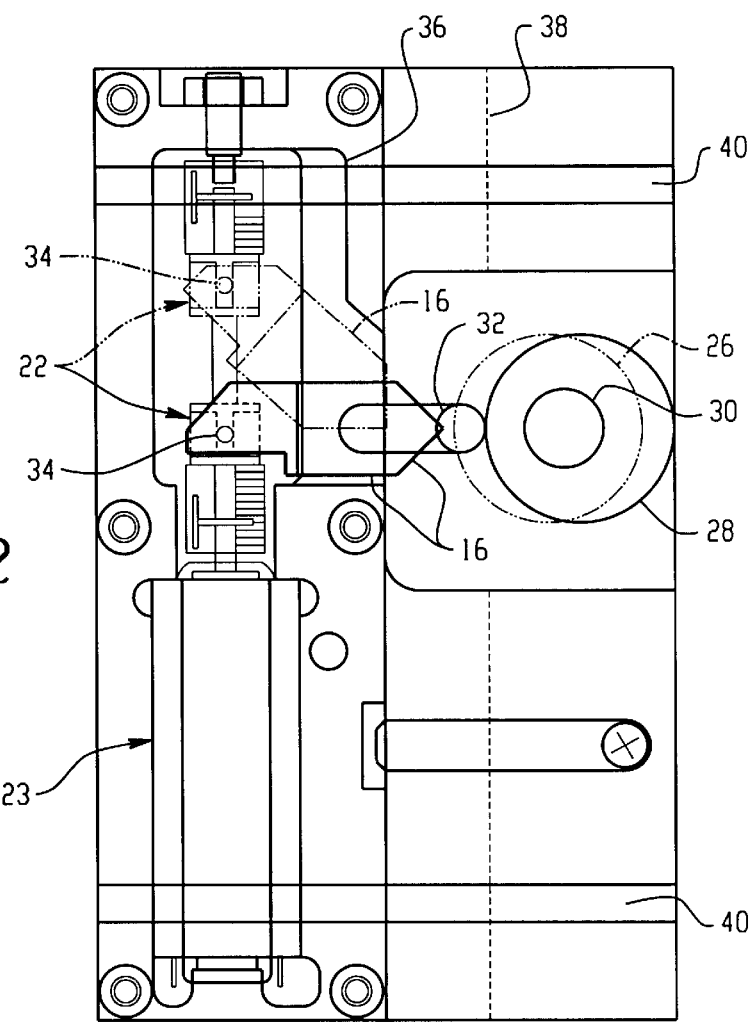
FIG. 2 illustrates the pinch valve of the present invention with the open and closed positions of the valve overlapping.
Figure 4:
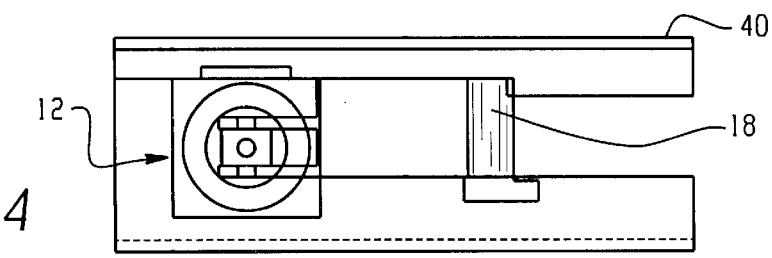

Referring to Figs 1a, 1b and 2, there is illustrated the preferred embodiment of the present invention, which is a pinch valve that is generally designated 10. The pinch valve 10 comprises a linear actuator 12. The linear actuator generally follows the path 13. Preferably, the linear actuator 12 is a lead screw driven by a motor 23. The linear actuator 12 enables pressure to be applied at the pressure point 14 by pointer 16, which actually pinches the valve closed. A pointer 16 rides on the follower 22 of the linear actuator 12 by way of a pivot 34. The pointer 16 is guided so that the end of the pointer 16 that is going to contact the tube 18 moves along a path that is essentially orthogonal to the tube 18, but the linear actuator 12 that drives it is roughly parallel to the tube 18.

It is contemplated by the present invention that when the tube 18 is very nearly pinched off, i.e. as the pointer 16 pinch-off point is approached, the pressure pointer 16 approaches a right angle to the tube 18 and also approaches a right angle to the actuator 12. As will be appreciated by those skilled in the art, the mechanical advantage is tremendous at that point. Thus, the present invention provides the maximum amount of pressure at the point where the pressure is needed in order to do the final pinch off. As those skilled in the art will appreciate, the tremendous mechanical advantage of the present invention is actually contrary to what happens in a spring loaded system. In contrast, in a spring loaded system, the spring is the weakest at the point where strength is needed the most.

It is contemplated by the present invention that no power is required once the valve is pinched off. The linear actuator 12 stops and binds the pointer 16 in between the pivot 34 and the tube 18 at the pressure point 14, providing a mechanism that binds the valve 10, thereby eliminating any power requirement to maintain the valve 10 in a closed position. Similarly, in the open position the present invention doesn't require any power. Consequently, a valve embodying the present invention doesn't impart any heat to the system except when its actually moving. Even then, that limited heat is isolated from the fluid flow itself.

The present invention further employs a positive pinch off There are not any springs involved in the system, and when the pointer 16 comes down it pinches the tube against a movable back piece 25, preferably an eccentric 24. By turning the eccentric 24, the eccentric gets closer or further away from the pinch point. This enables an operator of the valve to put a piece of tubing 18 in and adjust the eccentric 24 to get the desired amount of pinch off. This minimizes the danger of cutting through the tube because no additional pressure is applied other than that pressure required to stop the fluid flow. A significant problem with earlier pinch valves is that they tend to cut through tubing. The present invention avoids this problem by providing this positive stop rather than providing a constant pressure that over time may pinch into the tube.

The minimum 26 and maximum 28 positions of the eccentric 24 are shown in FIG. 2. The small hole in the center of the eccentric 24 is the pivot 30. As the eccentric 24 is turned, it either moves to widen or lessen the distance to the pointer. The eccentric 24 may have movement along an orthogonal axis also, but that movement is coincidental. The pointer has an end portion 32 that actually pinches off the tube. Like the eccentric 24, the pointer is in FIG. 2 illustrated in two positions.

The end portion of the pointer 16 appears as an arrow on the right side of it. On the opposite end of the pointer 16 is a pivot 34. The pivot 34, allows the pointer 16 to pivot along the follower 22 as the valve moves from the open and closed position and back.

In the preferred embodiment, the pointer 16 has a circular guide 48 at the arrow end 32. This guide fits in channel 36 that is cut into the valve body perpendicular to the tubing 18, and forces that end 32 of the pointer 16 to follow a path that is essentially perpendicular to the tube 18. The guide 48 is sub-flush to the body of the valve 10 and the pointer 16 then follows in the race track shaped channel 36 that is shown stretching left to right in FIG. 2. However, other equivalents are acceptable provided that the arrow end 32 of the pointer 16 is perpendicular to the tube 18 and the linear actuator 12 in the pinch-off position.

Figure 6:
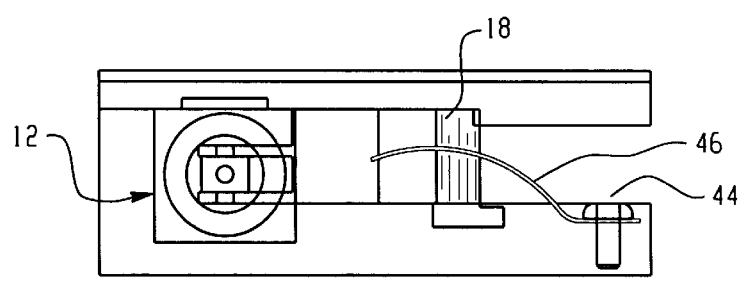
FIG 6 is a left side view of an alternative embodiment of the pinch valve of the present invention.

The tube 18 is placed in between the pointer 16 and the eccentric 24 so that the tube 18 would be pinched when the pointer 16 is closed, and retracted away from the eccentric 34 when the pointer 16 is up at roughly a 45 degree angle. Optionally, as is shown in FIG. 6, a leaf spring 46 is utilized to engage the tube 18 with the valve 10 to hold the tube 18 in place when the pointer is not engaging it. This spring 36 is held in place by a screw 44. It is also contemplated that a plurality of springs 36 are suitable to increase stability.

As shown in FIG. 2, it is also contemplated that the present invention may include a relief (not shown), along the axis 38, and under the cover so that the tube 18 fits under spanning from the top of the diagram to the bottom. This feature enables a U or C shaped piece of tubing to be fit into the valve without breaking the flow.

A relief not only enables a user to visually inspect the tube, but the user can bend the tube a U shape piece, or a C shape piece, and fit it in without breaking the flow. If a user has a system that is setup and that is working and flowing, the user may not want to open up the system. With the present invention, the user does not have to install the tube 18 in this valve 10. The user can simply loop it into a C shape, fit it over the eccentric 24 and then straighten it out so that it is oriented between the pointer 16 and the moveable back piece 25 or eccentric 24 and is retained by the spring 46.

Figures 5, 7:
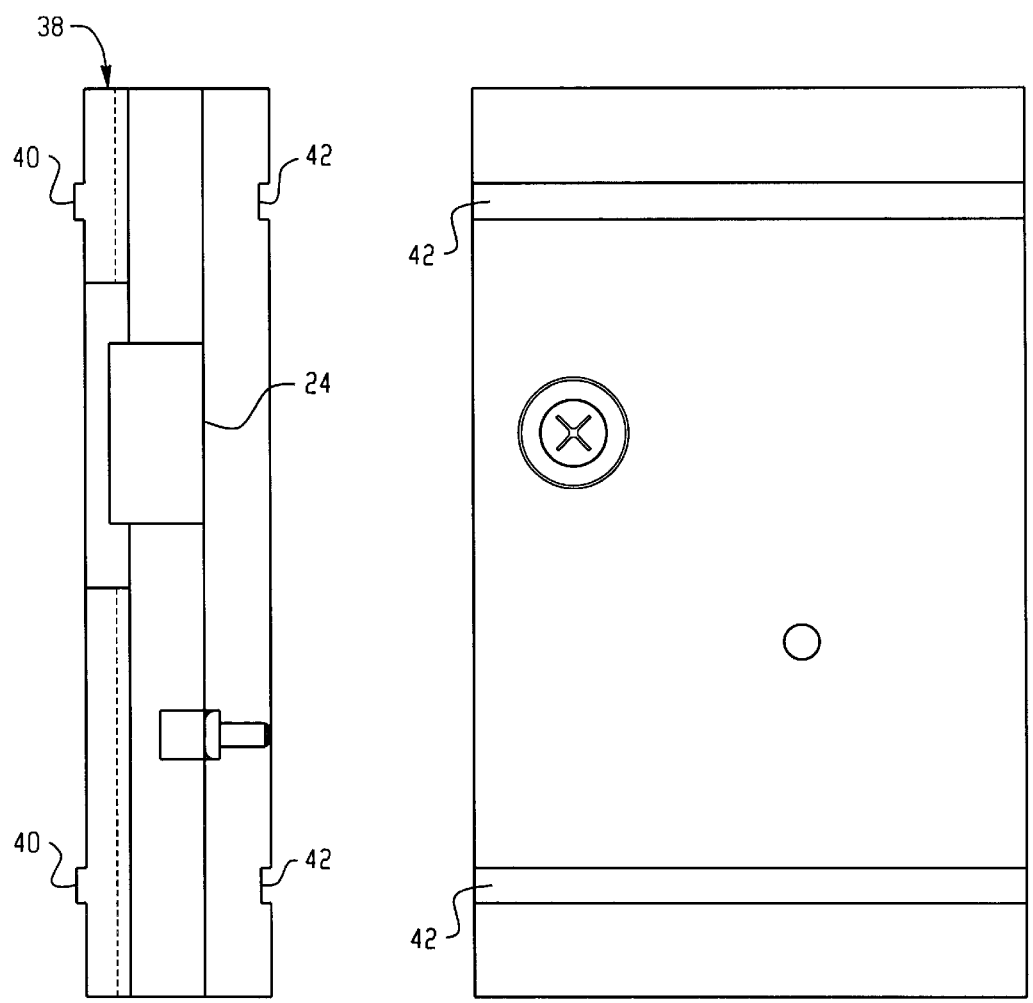
FIG 5 is the front view of the pinch valve of the present invention.
FIG. 7 is a bottom view of the pinch valve of the present invention.

Referring now to FIG. 5, there are illustrated notches 40, which enable the valve units to be stacked. Mating notches 42 are visible on the bottom of the valve 10. These can be slid on top of each other making the units stackable. In the preferred embodiment, because the actuator 12 is parallel with tube 18, the valve 10 is really a very thin structure, much thinner than most pinch valves. It is contemplated that up to eight valves 10 may be stacked in less than six inches. The stacking feature is particularly advantageous where the user is working on experiments where it is desirable to keep the tubing as short as possible.

Figure 8A:
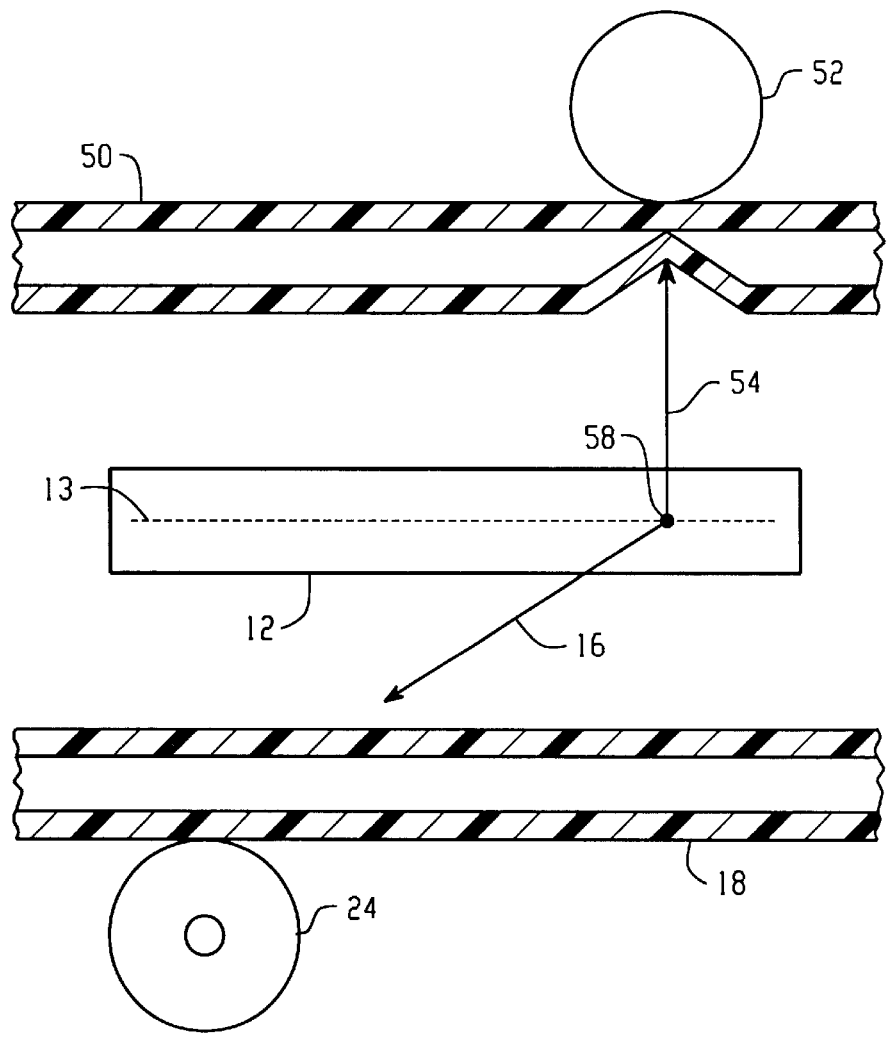
FIG. 8a is an alternative embodiment of the present invention illustrating the present invention being utilized as a three way valve.
Figure 8B:
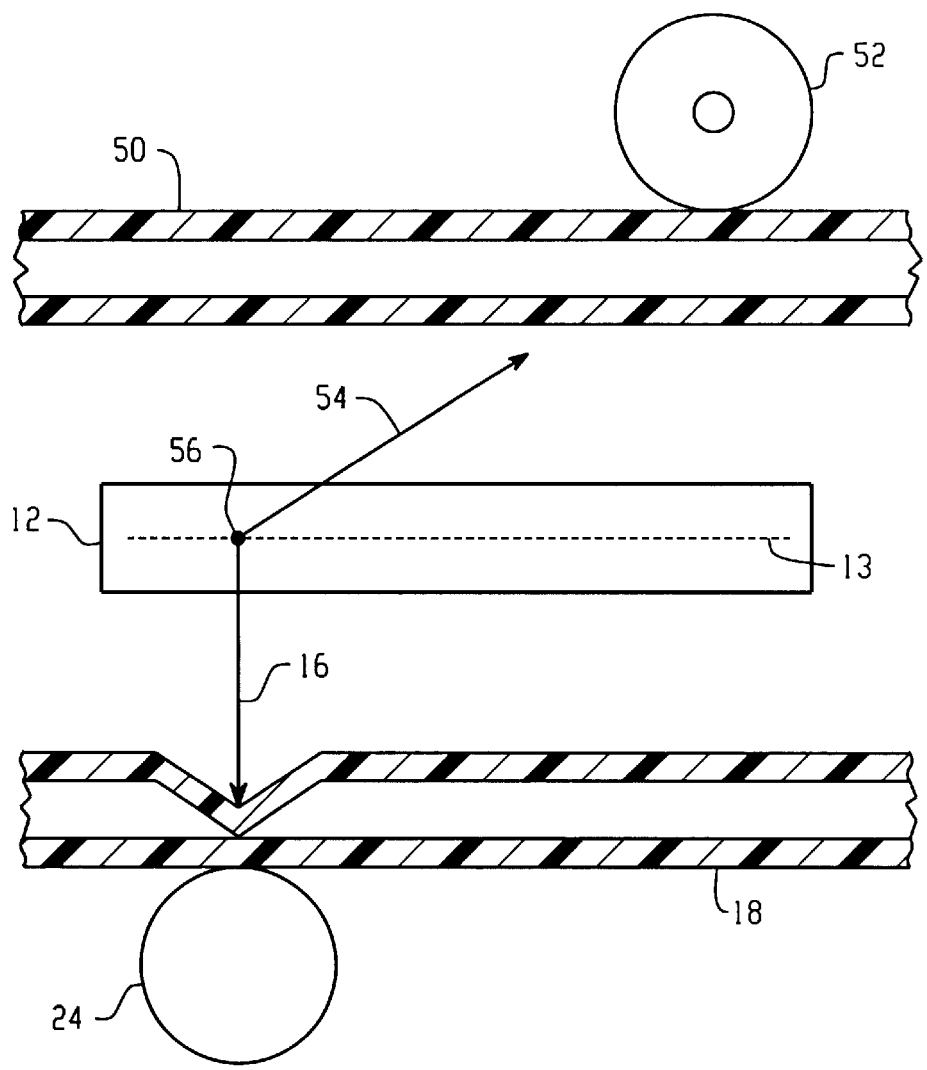
FIG. 8b shows the three way valve of FIG. 8a with the actuator of the valve in an alternate position.

In an alternative embodiment, as shown in FIGS. 8a and 8b, the valve 10 can be operated as a 3-way valve with minor modifications. A second pointer 54 is rotating on the same path 13 as the first pointer 16 and at the same or adjacent pivot point 34, but oriented with a separate channel (not shown), essentially parallel to the first channel 36. This will allow the free end of the pointer 54 to be phased opposite to first pointer 16, that is, to be in a pinch-off position when the other is in the retracted position and similarly to be in the retracted position when the other is in the pinch-off position. Thus, by extending the body of valve out and installing a second pointer 54 on the opposite side of the first pointer 16 with second guide (not shown) and a second eccentric 52, and a second tube 50, a three-way pinch valve is formed.

FIG. 8a shows the operation when the pivot 34 is at position 58. Pointer 54 is perpendicular to tube 50 and tube 50 is pinched off, while pointer 16 is retracted from tube 18. FIG. 8b shows the operation when the pivot 34 is at position 56. Pointer 16 is perpendicular to tube 18 and tube 18 is pinched off, while pointer 54 is retracted away from tube 50.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A pinch valve for pinching off a tube, the valve having an open position and a closed position, comprising:
   a linear actuator positioned proximate to one side of the tube and oriented generally parallel to the tube;
   a moveable back located proximate to the opposing side of the tube; and,
   a pointer pivotally connected to the linear actuator, the pointer having a pivotal end and a non-pivotal end;
   wherein the pointer is not in contact with the tube when the pinch valve is in the open position, and is perpendicular with the tube in the pinched-off position, and wherein movement of the moveable back piece selectively controls pressure applied to the tube, and wherein the moveable back piece is an eccentric.

2. The pinch valve of claim 1 further comprising a guide for assuring a path of travel for the non-pivotal end of the pointer which causes the non-pivotal end of the pointer to be perpendicular to the tube when the valve is in the closed position.

3. The pinch valve of claim 1 wherein the linear actuator further comprises a motor for driving the actuator.

4. The pinch valve of claim 3 wherein the linear actuator further comprises a follower which connects the pointer to the motor.

5. The pinch valve of claim 1 wherein the eccentric is adjustable to a maximum and a minimum position.

6. The pinch valve of claim 1 wherein the actuator is a lead screw driven by a motor.

7. The pinch valve of claim 1 further comprising a biasing spring, the biasing spring adapted to engage the tube and holding the tube in position.

8. The pinch valve of claim 1 further comprising a plurality of biasing springs, the springs adapted to engage the tube and holding the tube in position.

* * * * *